United States Patent
Fernandes

(10) Patent No.: US 7,568,703 B1
(45) Date of Patent: Aug. 4, 2009

(54) GAME AND METHOD OF PLAYING

(76) Inventor: Anthony J. Fernandes, 27 Peckham Ave., Newport, RI (US) 02840

( * ) Notice: Subject to any disclaimer, the term of this patent is extended or adjusted under 35 U.S.C. 154(b) by 147 days.

(21) Appl. No.: 11/289,146

(22) Filed: Nov. 29, 2005

Related U.S. Application Data

(60) Provisional application No. 60/631,783, filed on Nov. 30, 2004.

(51) Int. Cl.
*A63F 1/00* (2006.01)
*A63F 9/20* (2006.01)
*A63F 3/00* (2006.01)
*G09B 19/22* (2006.01)

(52) U.S. Cl. .............. 273/292; 273/299; 273/431; 273/258; 273/456; 273/302; 434/129

(58) Field of Classification Search ............... 273/292, 273/299, 431, 258, 256, 302; 434/129
See application file for complete search history.

(56) References Cited

U.S. PATENT DOCUMENTS

| | | | |
|---|---|---|---|
| 3,143,348 A * | 8/1964 | Carsen et al. | 273/294 |
| 3,935,651 A | 2/1976 | Mankoff et al. | |
| 4,378,942 A * | 4/1983 | Isaac | 273/278 |
| 4,824,118 A | 4/1989 | Fusaro et al. | |
| 5,120,066 A * | 6/1992 | Cohen | 273/258 |
| 5,297,801 A * | 3/1994 | Croker | 273/430 |
| 5,310,347 A | 5/1994 | Brand | |
| 5,316,482 A * | 5/1994 | Bryson | 434/129 |
| 5,492,473 A | 2/1996 | Shea | |
| 5,895,050 A | 4/1999 | Dodd et al. | |
| 6,139,016 A * | 10/2000 | Plato | 273/242 |
| 6,328,308 B1 | 12/2001 | Kirby | |
| 6,702,581 B1 | 3/2004 | Walker | |
| 6,761,356 B1 | 7/2004 | Jacobson et al. | |
| 2003/0052456 A1* | 3/2003 | Lasko et al. | 273/430 |

* cited by examiner

*Primary Examiner*—Gene Kim
*Assistant Examiner*—Michael D Dennis
(74) *Attorney, Agent, or Firm*—Salter & Michaelson

(57) ABSTRACT

A playing card apparatus that has a deck of a multiplicity of different keyword cards, each card representing a predetermined term and associated definitions thereof, and with each card displaying indicia thereon including a base term, certain definitions of which are to be selected by a player. The card also includes a plurality of definition terms and means for highlighting only the correct definition or definitions of the plurality of definition terms. Also included are a set of response cards, each response card having indicia thereon corresponding to one of the definition terms, a timer for setting a time period for a player to submit answers via selection of one or more response cards by the player and a score card to be filled in by the dealer with the scoring based upon correct and incorrect answers by the player.

1 Claim, 3 Drawing Sheets

| Player/Team Name | Card Answers/Point Value |||||||||| |
|---|---|---|---|---|---|---|---|---|---|---|
| | 1 A/P | 2 A/P | 3 A/P | 4 A/P | 5 A/P | 6 A/P | 7 A/P | 8 A/P | 9 A/P | 10 A/P |
| | abcd/4 | ab/2 | a/1 | abcd/4 | abcd/4 | / | / | / | / | / |
| | Player/Team Answers/Score |||||||||| |
| 1. Moe | 1 A/P | 2 A/P | 3 A/P | 4 A/P | 5 A/P | 6 A/P | 7 A/P | 8 A/P | 9 A/P | 10 A/P |
| | abcd/4 | ab/6 | a/7 | abcd/11 | abcd/15 | / | / | / | / | / |
| | Player/Team Answers/Score |||||||||| |
| 2. Larry | 1 A/P | 2 A/P | 3 A/P | 4 A/P | 5 A/P | 6 A/P | 7 A/P | 8 A/P | 9 A/P | 10 A/P |
| | abc/2 | cd/-2 | a/-1 | abcd/3 | abcd/7 | / | / | / | / | / |

GAME AND METHOD OF PLAYING

RELATED CASES

Priority for this application is hereby claimed under 35 U.S.C. § 119(e) to commonly owned and U.S. Provisional Patent Application No. 60/631,783 which was filed on Nov. 30, 2004.

TECHNICAL FIELD

The present invention relates to a game that uses playing cards and also relates to the method of playing the game.

BACKGROUND

Various types of educational card games exist. Some of these are referred to as question and answer games and others are referred to as vocabulary or teaching games. However, none of the existing card games are directed to words or phrases and the corresponding slang language that is used to describe these words or phrases.

Accordingly, it is an object of the present invention to provide a game that uses common words, phrases and expressions to test competing players knowledge of slang language, particularly English slang language.

Another object of the present invention is to provide a card type game uses both keyword and response cards and that can be adapted for other game categories, such as for vocabulary usage.

SUMMARY OF THE INVENTION

The foregoing and other objects of the invention are achieved by providing a playing card apparatus that is comprised of a deck of a multiplicity of different keyword cards, each card representing a predetermined term and associated definitions thereof, and with each said card displaying indicia thereon including a base term, certain definitions of which are to be selected by a player. There is also included a plurality of definition terms and means for highlighting only the correct definition or definitions of the plurality of definition terms.

In accordance with other aspects of the present invention there are a plurality of correct definitions on at least some of the cards; there are a plurality of correct definitions on most of the cards; the base term may be at least one of a word, phrase, statement, clause or expression; there may be an indicia for a "clue" associated with the base term; and the associated definitions may be slang terms.

The playing card apparatus may also be used in combination with a set of response cards with each card having identifying indicia corresponding to one of the plurality of definitions terms. Furthermore, the combination may include a score card having indicia hereon indicating scores attained by the players.

In accordance with another embodiment of the invention there is provided a method of playing a card game with a dealer and a plurality of players. This method includes the steps of providing a deck of a multiplicity of different keyword cards, each card representing a predetermined term and associated definitions thereof, each said card displaying indicia thereon including a base term, certain definitions of which are to be selected by a player, and a plurality of definition terms; providing to each player a set of response cards, each response card having indicia thereon corresponding to one of the definition terms; having the dealer select a keyword card, one at a time, from the deck so as to be able to indicate to the players the selected base term, as well as the plurality of definition terms; having each player respond to the base term on a selected keyword card by selecting one or more response cards that correspond to the players selected answer or answers of the listed definition terms; and scoring the players answers based on the players selection.

In accordance with other aspects of the present invention there may be provided a timer to limit the response time of the player; an indicia may be provided on each keyword card for a clue associated with the base term; the response cards are preferably presented face down until scoring occurs; a score card may be provided to be filled in by the dealer; and the scoring preferably includes adding a point for each correct answer, subtracting a point for each incorrect answer and subtracting a point for each correct answer that is not answered.

In accordance with another embodiment of the invention there is provided a playing card system in which there is provided a dealer and a plurality of players. The system comprises a deck of a multiplicity of different keyword cards, each card representing a predetermined term and associated definitions thereof, each said card displaying indicia thereon including a base term, certain definitions of which are to be selected by a player, and a plurality of definition terms; a set of response cards, each response card having indicia thereon corresponding to one of the definition terms; a timer for setting a time period for a player to submit answers via selection of one or more response cards by the player; and a score card to be filled in by the dealer and based upon correct and incorrect answers by the player.

In accordance with other aspects of the present invention there may be provided a plurality of correct definitions on at least some of the cards; there may be a plurality of correct definitions on most of the cards; the base term may be at least one of a word, phrase, statement, clause or expression; there may be on the card an indicia for a "clue" associated with the base term; and preferably the associated definitions are slang terms.

DESCRIPTION OF THE DRAWINGS

Numerous other objects, features and advantages of the present invention should now become apparent upon a reading of the following detailed description taken in conjunction with the accompanying drawings, in which.

DETAILED DESCRIPTION

The game of the present invention uses common words, phrases and expressions to test the skill of competing players. The game is particularly directed to words, phrases and expressions that have corresponding slang language or terms. The game of the present invention can be played by people of different ages but is preferably used for players over 15 years of age. There is virtually no limit on the number of players that can partake in the playing of the game.

The game may be played singly or in teams. For singles play one player plays against each of the other players. For team play one or more teams plays against other teams. Players are divided into the teams with preferably equal numbers of players on each team.

The objective of the game is to listen to a keyword and preferably also an associated "clue," and to choose from a number of given answers. In the preferred embodiment described herein there are four choices of slang words or terms. Of those words or terms some of the answers are correct and others are not correct. There may be, for example, even four correct answers. These are indicated by the use of response cards labeled A, B, C and D to indicate their choices. In accordance with one scoring scheme of the invention, one point is awarded for each correct answer, but one point is also subtracted for an incorrect or a missed answer. In the preferred embodiment of the invention, the first player or team to accumulate 14 points wins the game. However, other total point counts can be used as a winning count.

Figure 1:
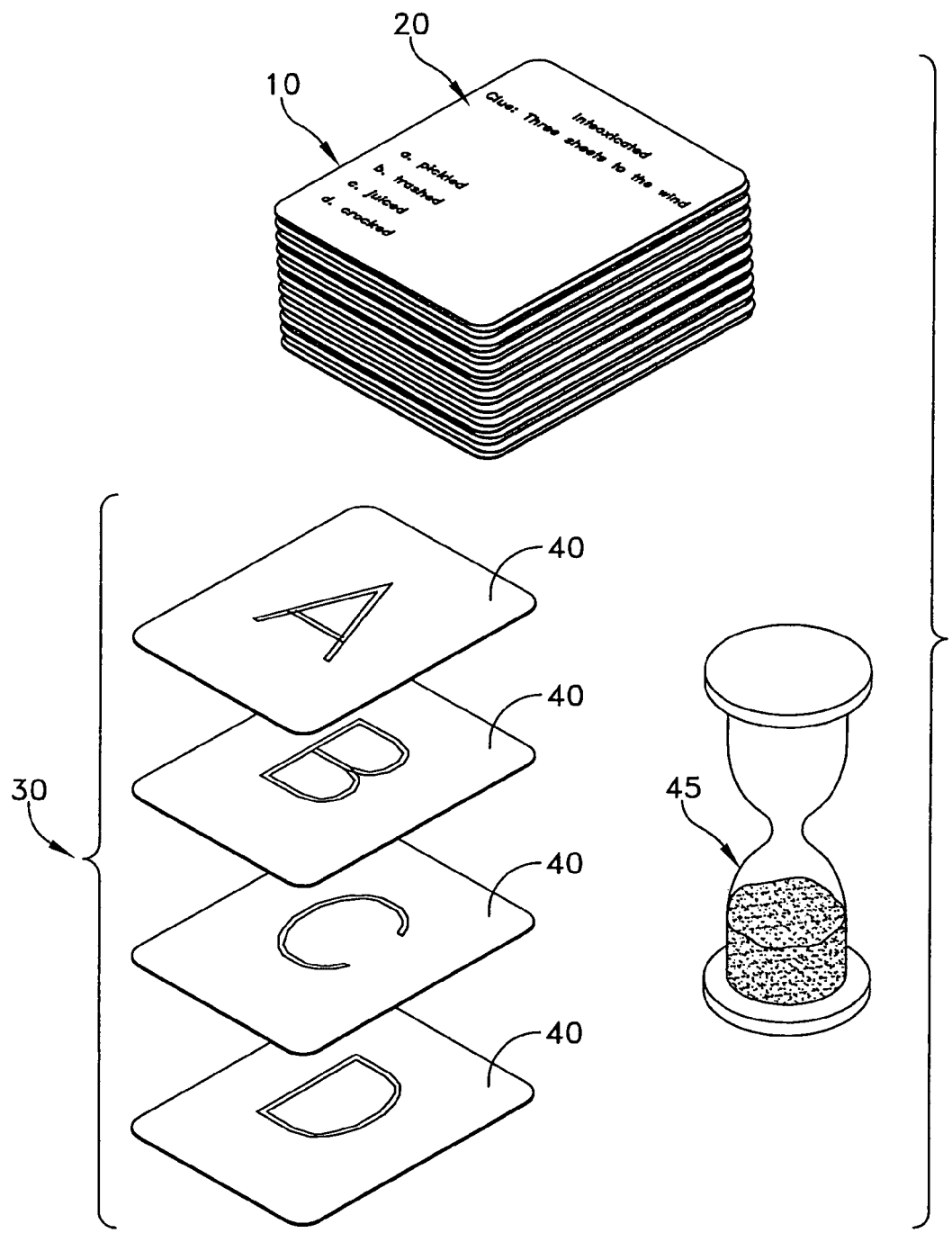
FIG. 1 is a perspective view illustrating the basic components of the card game of the present invention.
Figure 2:
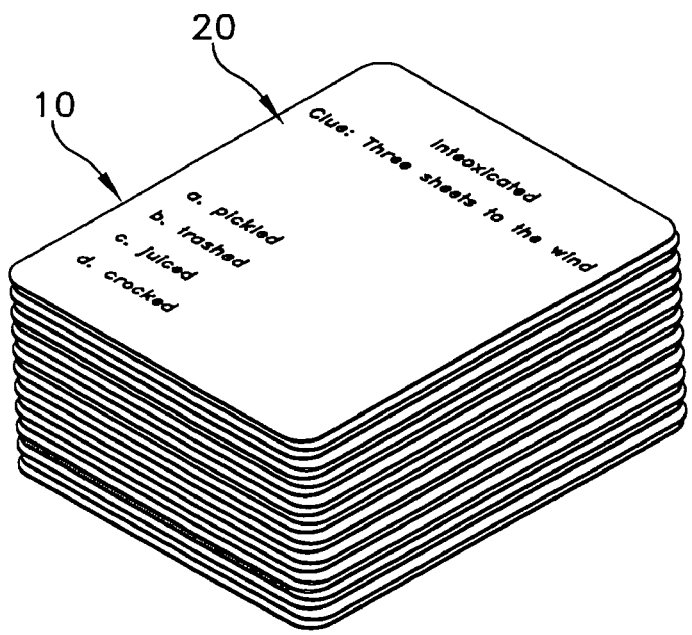
FIG. 2 is a perspective view of the main card deck.
Figure 3:
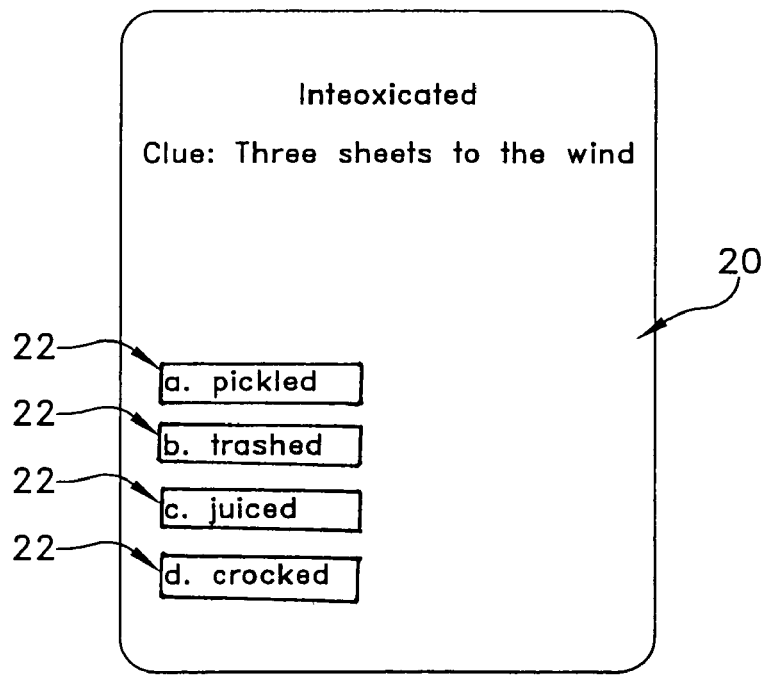
FIG. 3 is a top plan view of a typical keyword card from the deck of FIG. 2.

The basic components that comprise the game are illustrated in FIG. 1. This includes a main deck 10 of a multiplicity of keyword cards 20. Refer also to FIGS. 2 and 3 for further details of the deck 10 and the particular indicia on the cards 20. FIG. 1 also illustrates the deck 30 of response cards 40. Finally, in FIG. 1 is illustrated the timer 45. FIG. 1 illustrates an hourglass timer, however, any other type of timing device can be used for recording a predetermined time period such as the 20 seconds that is used in accordance with the preferred technique of playing the game.

The keyword card deck 10 may comprise, for example, 500 separate and different cards. The response card deck 30 may include, for example, a total of 40 cards separated into 10 different sets each of four cards. Each set contains four cards labeled as A, B, C and D. These designations correspond to the four answers a, b, c and d found on the keyword card 20, as illustrated in FIG. 3.

For "singles" play any particular player may deal first. The first player may be selected in any manner such as by the roll of a dice. The dealer takes possession of all of the cards, the timer and the score card. The dealer is not expected to participate in the play nor will the dealer usually receive any score points while being the dealer. The dealer is excluded from playing and scoring points for the round in which he or she is selected as the dealer, because the dealer sees the correct answers on each card selected. Once the deal is passed then the previous dealer can score points. For "singles" play, the deal is passed after a round. The dealer may be passed either to the left or to the right. The deal is preferably passed to the left of the previous dealer for each subsequent round. The dealer of the previous round may now participate in play and the scoring of points. For "team" play, one player other than a team member is selected as the dealer for the entire game. The dealer sets the timer and keeps the score.

The game of the present invention is initiated by the dealer selecting one card from the deck 10. Each selected card should be discarded in a separate pile and should not be used for the remainder of the game. Upon completion of a game, the discarded pile may then be reshuffled back into the deck for use in the next game.

Reference is now made to FIG. 3 for a plan view of a representative keyword card 20. In this case the keyword is "intoxicated." The "clue" is "three sheets to the wind." Below the keyword and the clue are four possible answers. These are labeled as answers a, b, c and d. Of course other designations can be used to identify each answer, such as numbers instead of letters.

The dealer then announces the number of the round in play. This commences with, for example, number "one" and continues in sequence for the duration of the game. For "singles" operation this consists of several rounds with several dealers for the entire game. Preferably, the number of rounds corresponds to the number of players. In that way each player has the same opportunity for scoring.

The dealer than reads out loud the keyword which in the instance of FIG. 3 is the word "intoxicated." The dealer then next reads out loud the "clue" for the keyword which in the case of FIG. 3 is the term "three sheets to the wind." The dealer then reads out loud the four multiple choices listed beside the letters labeled a, b, c and d. The dealer will thus say:

"a . . . pickled"
"b . . . trashed"
"c . . . juiced"
"d . . . crocked."

The dealer then announces that the players have 20 seconds to select there answers. To accurately record this time, the dealer will set the timer 45. The dealer may read the keyword, clue and four multiple choice answers once again during the 20 second time period to refresh the players' memory. The dealer thus states the following:

"Intoxicated"
"Clue: Three sheets to the wind"
"a . . . pickled"
"b . . . trashed"
"c . . . juiced"
"d . . . crocked."

Figures 4, 5:
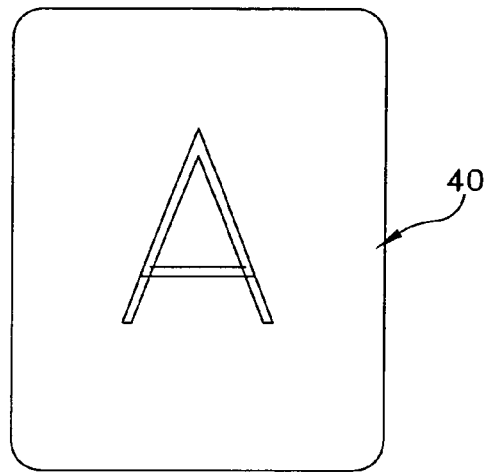
FIG. 4 is a top plan view of a typical response card.
FIG. 5 illustrates the layout of the score card.

The players can indicate their choice at any time during the 20 second time period. For this purpose, each of the players is provided with a set of response cards 40, such as illustrated in FIG. 4. In the example given herein, the set of response cards includes four cards respectively labeled A, B, C and D. Each of these cards corresponds with one of the four multiple choices (a, b, c, and d) appearing on the keyword card 20. The selected response cards are placed face down on the table in front of each player so that each players answers are not revealed. Any response cards not selected are kept in the hands of the player. There may be up to four correct choices. For many of the cards less than four correct answers are used. At the end of the 20 second time interval all play stops. The dealer announces that the time has ended and that that particular round is over.

The next steps in playing the game relate to the scoring of points. The dealer next reveals the point value for the selected card for that round. In the example illustrated in FIG. 3, the maximum point value is four points, corresponding to the four correct answers. This is worth four points because all of the answers are correct answers and on the card these are highlighted as correct answers as illustrated at 22. This "highlighting" may be provided in a number of different ways. In the example of FIG. 3, the highlighting occurs by virtue of a highlight marking over each of the choices. This marking still allows one to see the posted answer. Alternatively, other means may be used for providing the highlighting such as by circling the correct answers or using an arrow to point to the correct answers. Also, the correct answers may be indicated in bold type. Of course, the "clue" is not included in the point values. In the example provided in FIG. 3, if a player put face down all of their cards then they would have received the full four points.

The next move in the scoring sequence is for the dealer to instruct each player to reveal their answers by turning their response cards face up. The dealer than reveals the correct answers on the keyword card. In the example described above, all four choices are the correct answers and thus the dealer indicates this to each of the players. The response cards of each player are to remain on the table face up until the scoring is completed for all players.

Reference is now made to FIG. 5 for an illustration of a typical score card 50 that is used in playing the card game of the present invention.

1. In the box titled "Card Answers/Point Value," there are ten slots or rounds numbered 1 through 10. Slots are divided in two parts by a slash (/). The first part represents the card's answers "A" and the second part represents the card's point value "P."

a. Dealer enters the card's answers in the first part of the slot "A" in the Card Answers/Point Value" box at the end of each round of play.

b. Dealer enters the card's point value in the second part of the slot "P" in the "Card Answers/Point Value" box at the end of each round of play.

2. In the box titled "Player/Team Answers/Score," there are ten slots or rounds numbered 1 through 10. Slots are divided in two parts by a slash (/). The first part represents the player/team answers "A" and the second part represents the player/team score "S."

a. Dealer enters player's answers in the first part of the slot "A" in the "Player/Team Answer/Score" box at the end of each round of play.

b. Dealer compares the answers in the first part of the slot "A" in the "Player/Team Answers/Score" box against the answers in the first part of the slot "A" in the "Card Answers/Point Value" box for that round of play.

c. Dealer adds or subtracts points according to the following score rules:

1. Add one point for every correct answer selected.

2. Subtract one point for every correct answer not selected.

3. Subtract one point for every incorrect answer selected.

d. Dealer enters player's score in the second part of the slot "S" in the "Player/Team Answers/Score" box for that round of play.

e. Player's scores, from round 2 and on, are not entered in the Player/Team Answers/Score" box for that round of play until the dealer adds or subtracts that score to or from the score of the previous round.

As indicated previously, the first player or team to reach 14 points or higher in one game wins the game. Of course, other total point numbers may be used. In the case of a tie score with two or more players reaching 14 points or higher, only those points attaining that level will continue play to play one or more bonus rounds. Players that did not reach 14 points are out of the game. Bonus rounds may be continued until another point level is reached or on a sudden death basis. Thus, for "singles" bonus play each player gets their round as the dealer. At the end of each full bonus round of play the score is taken. The player with the highest score wins. If the bonus rounds result in another tie, then the process is repeated and each player gets their round as the dealer. For "team" bonus play, at the end of the first bonus round of play the score is taken and the team with the highest score wins. If the bonus round results in another tie, then the bonus round is replayed.

It has been indicated previously that the dealer does not accumulate any points while a dealer. However, in another version of the game, the dealer may be entitled to receiving points. For example, if a particular player did not select any of the correct answers for that specific round, the dealer may be awarded the point value of the card for that round.

In the preferred embodiment of the present invention, the game is played with keyword cards and definitions that are in the form of slang words or terms. In an alternate embodiment of the present invention, cards may be used with keywords and the definitions need not be slang terms but could be a serious of choices of particular definitions associated with the keyword. The "clue" may be used as illustrated in FIG. 3 or in an alternate embodiment of the invention no clue need be included. In the embodiment of the invention described herein, the multiple choices are listed by alphabetic numbers but could just as easily be listed by other sequential descriptions. The response cards are then labeled corresponding to these sequential descriptions on the keyword cards.

In accordance with the embodiments of the game described herein, the scoring has been described as on the basis of a single point. However, in other versions of the card game of the present invention, different point schemes may be adopted. For example, one may receive two points for a correct answer and one point for an incorrect or missed answer. Also, it is anticipated that in accordance with the present invention a number of different types of "highlighting" may be used to indicate to only the dealer which of the choices is the correct choice or choices. This may be by means of a highlighted marking over the word, by circling, an arrow, a bolding or any other means indicative of the correct answer. Alternatively, the keyword cards can be illustrated so that the incorrect answers are highlighted. This, of course, would be known to the dealer ahead of time such as via the instructions with the game.

It is also noted, as in FIG. 5, that only the cumulative score is kept regarding each player. However, in an alternate embodiment of the present invention, individual round scoring may also be kept, along with the cumulative score.

In the detailed description and claims herein the word "term" is used to describe a word, phrase, clause, expression or any other single or multiple statement of words. Also, herein the word "definition" may refer to slang terms, vocabulary terms, or other associated terms that have some relationship to the keyword.

Having now described a limited number of embodiments of the present invention it should be apparent to those skilled in the art that numerous other embodiments and modifications thereof are contemplated as falling within the scope of the present invention, as defined by the appended claims.

What is claimed is:

1. A method of playing a card game with a dealer and a plurality of players, comprising:

providing a deck of a multiplicity of different keyword cards, each card representing a predetermined non-slang word and associated slang definitions thereof, each said card displaying indicia thereon including a base non-slang word, certain slang definitions of which are to be selected by a player, and a plurality of slang definition terms;

providing to each player a set of response cards, each response card having indicia thereon corresponding to one of the slang definition terms;

providing a timer to limit the response time of the player and wherein the correct answer or answers on the keyword card are highlighted;

providing an indicia on each keyword card for a clue associated with the base word including a clue indicia on the keyword card for a slang clue associated with the base word, and wherein the slang clue indicia is disposed adjacent the base word and is separate from the list of slang definition terms;

having the dealer select a keyword card, one at a time, from the deck so as to be able to verbally indicate to all of the players the selected base non-slang word, as well as to verbally indicate the plurality of slang definition terms;

having each player respond to the base non-slang word on a selected keyword card by selecting one or more response cards that correspond to the players selected answer or answers of the listed definition terms and initially presenting the response card facing downwardly until scoring occurs;

and scoring the players answers based on the players selection;

wherein the scoring includes providing a single score card to be filled in by the dealer, the set of response cards being equal in number to the number of slang definition terms on each keyword card and with each response card having separate identifying indicia corresponding to one of the plurality of slang definitions terms, and the dealer's single score card having pre printed indicia thereon in a number of columns corresponding to the number of rounds to be played and in a number of rows corresponding in number to the number of players, whereby the dealer enters scores associated with each player at the pre-printed indicia;

wherein a plurality of rounds are played and the scoring rule for each round is base on the following rules;
  a. Add at least one point for every correct answer selected
  b. Subtract at least one point for every correct answer not selected
  c. Subtract at least one point for every incorrect answer selected wherein the dealer records points based on the above rules on a per player basis by first entering in a slot A the players selected one or more response cards, and second by entering in a slot P a score based on the above rules;

wherein the score is recorded from round to round on a cumulative basis for each player:

wherein the scoring excludes the clue indicia;

and wherein the dealer initially announces the number of the round presently in play, the dealer then next reads aloud the keyword selected, the dealer then next reads out loud the slang clue associated with the keyword, the dealer then reads out loud the multiple choices listed on the keyword card, the dealer then announces that the players have a predetermined time in seconds in which to select answers.

* * * * *